(12) United States Patent
Matsushita et al.

(10) Patent No.: US 7,711,047 B2
(45) Date of Patent: May 4, 2010

(54) DETERMINING INTENSITY SIMILARITY IN LOW-LIGHT CONDITIONS USING THE POISSON-QUANTIZATION NOISE MODEL

(75) Inventors: Yasuyuki Matsushita, Beijing (CN); Xiaoou Tang, Haidian District (CN); Francois Alter, Paris (FR)

(73) Assignee: Microsoft Corporation, Redmond, WA (US)

( * ) Notice: Subject to any disclaimer, the term of this patent is extended or adjusted under 35 U.S.C. 154(b) by 1115 days.

(21) Appl. No.: 11/275,265

(22) Filed: Dec. 21, 2005

(65) Prior Publication Data

US 2007/0147677 A1 Jun. 28, 2007

(51) Int. Cl.
*H04N 7/18* (2006.01)
(52) U.S. Cl. .............................. 375/240.03; 375/240.04
(58) Field of Classification Search .................................
375/240.01–240.29
See application file for complete search history.

(56) References Cited

U.S. PATENT DOCUMENTS 5,809,178 A 9/1998 Anderson et al.
6,462,768 B1* 10/2002 Oakley ........................ 348/31
6,754,298 B2 6/2004 Fessler
2005/0036174 A1* 2/2005 Lubin ........................ 358/3.14
2005/0276475 A1* 12/2005 Sawada ..................... 382/167

OTHER PUBLICATIONS

Alter, et al., "An Intensity Similarity Measure in Low-Light Conditions", pp. 1-14, Mar. 2006.
Kim, et al., "Improved Poisson Intensity Estimation: Denoising Application Using Poisson Data", Aug. 2004, vol. 13, No. 8, pp. 1128-1135.
Timmermann, et al., "Multiscale Modeling and Estimation of Poisson Processes with Application to Photon-Limited Imaging", IEEE, vol. 45, No. 3, Apr. 1999, pp. 846-862.
PCT Search Report For PCT Application No. PCT/US2006/048665, mailed Nov. 21, 2007 (10 pages).

* cited by examiner

*Primary Examiner*—Andy S Rao
(74) *Attorney, Agent, or Firm*—Lee & Hayes, PLLC

(57) ABSTRACT

A Poisson-quantization noise model for modeling noise in low-light conditions is described. In one aspect, image information is received. A Poisson-quantization noise model is then generated from a Poisson noise model and a quantization noise model. Poisson-quantization noise is then estimated in the image information using the Poisson-quantization noise model.

18 Claims, 8 Drawing Sheets

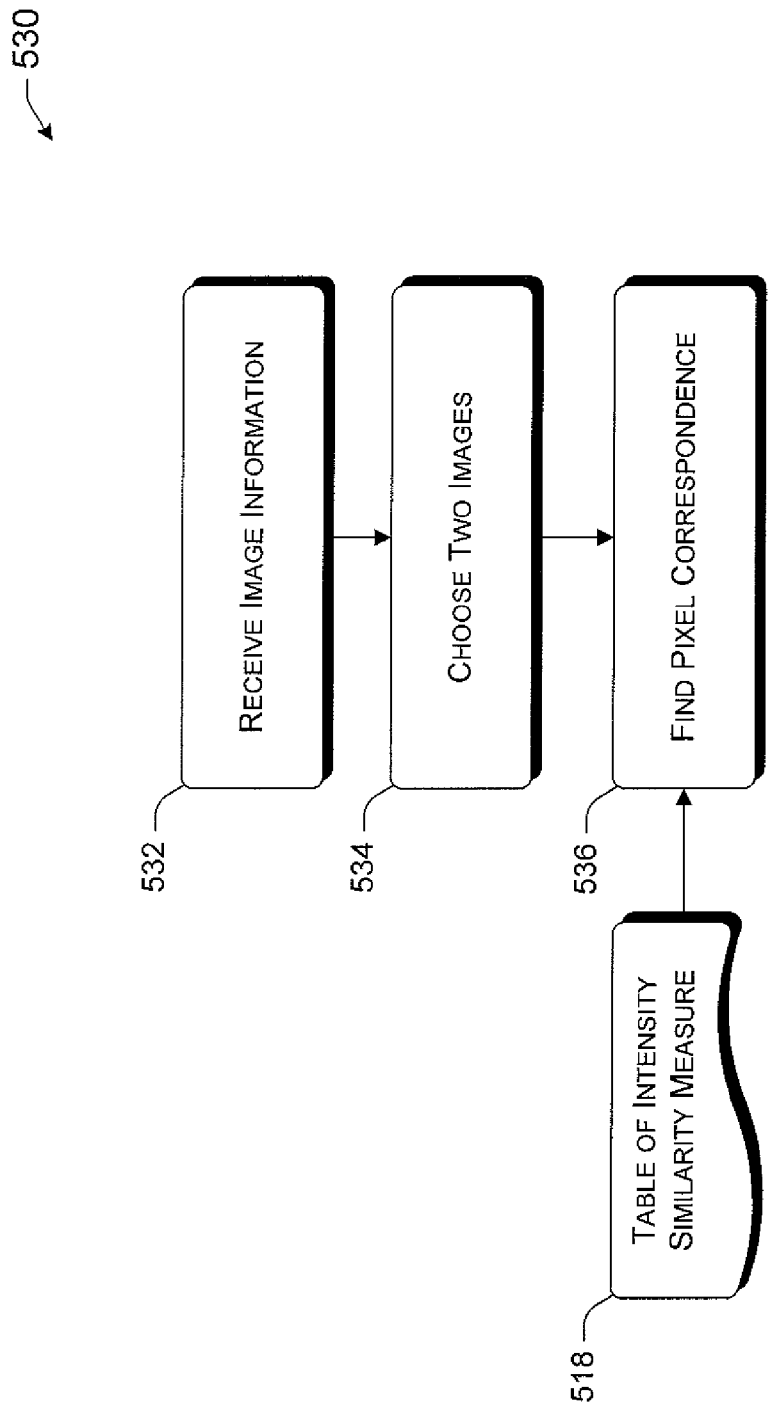

DETERMINING INTENSITY SIMILARITY IN LOW-LIGHT CONDITIONS USING THE POISSON-QUANTIZATION NOISE MODEL

BACKGROUND

Noise is inevitable in any imaging device. This is especially the case in low-light situations (also known as photon limited situations) arising from either a weak light source illuminating an object being photographed, or the use of a small or low quality lens by the device attempting to photograph the object. In either case, the low light situation often precludes the capture and rendering of a high quality image.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, a Poisson-quantization noise model for modeling noise in low-light conditions is described. In one aspect, image information is received. A Poisson-quantization noise model is then generated from a Poisson noise model and a quantization noise model. Poisson-quantization noise is then estimated in the image information using the Poisson-quantization noise model.

BRIEF DESCRIPTION OF THE DRAWINGS

In the Figures discussed below the left-most digit of a component reference number identifies the particular Figure in which the component first appears.

DETAILED DESCRIPTION

Overview

The following disclosure describes a Poisson-quantization (PQ) noise model which can be used to model noise in low-light conditions. In one embodiment, the PQ noise model may be used to create an intensity similarity function. It will be understood that the terms intensity similarity function and intensity similarity measure as used herein are interchangeable. In general, an intensity similarity measure represents a probability that two slightly different observations of a same (or same colored) point in a three dimensional scene are observations of the same point.

In one embodiment, the intensity similarity measure may be used to calculate an intensity similarity to process video content. These calculations may entail finding pixel correspondence among video frames that may be used for various image processing operations, for example, denoising, object tracking, pattern matching, etc., especially in low-light conditions.

These and other aspects of the systems and methods to model Poisson-quantization noise and generate an intensity similarity function based thereon are now described in greater detail.

An Exemplary System

Although not required, systems and methods to generate a Poisson-quantization noise model and an intensity similarity measure in low-light conditions are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, it will be understood that acts and operations described hereinafter may be implemented in any suitable hardware, software, firmware, or combination thereof.

Figure 1:
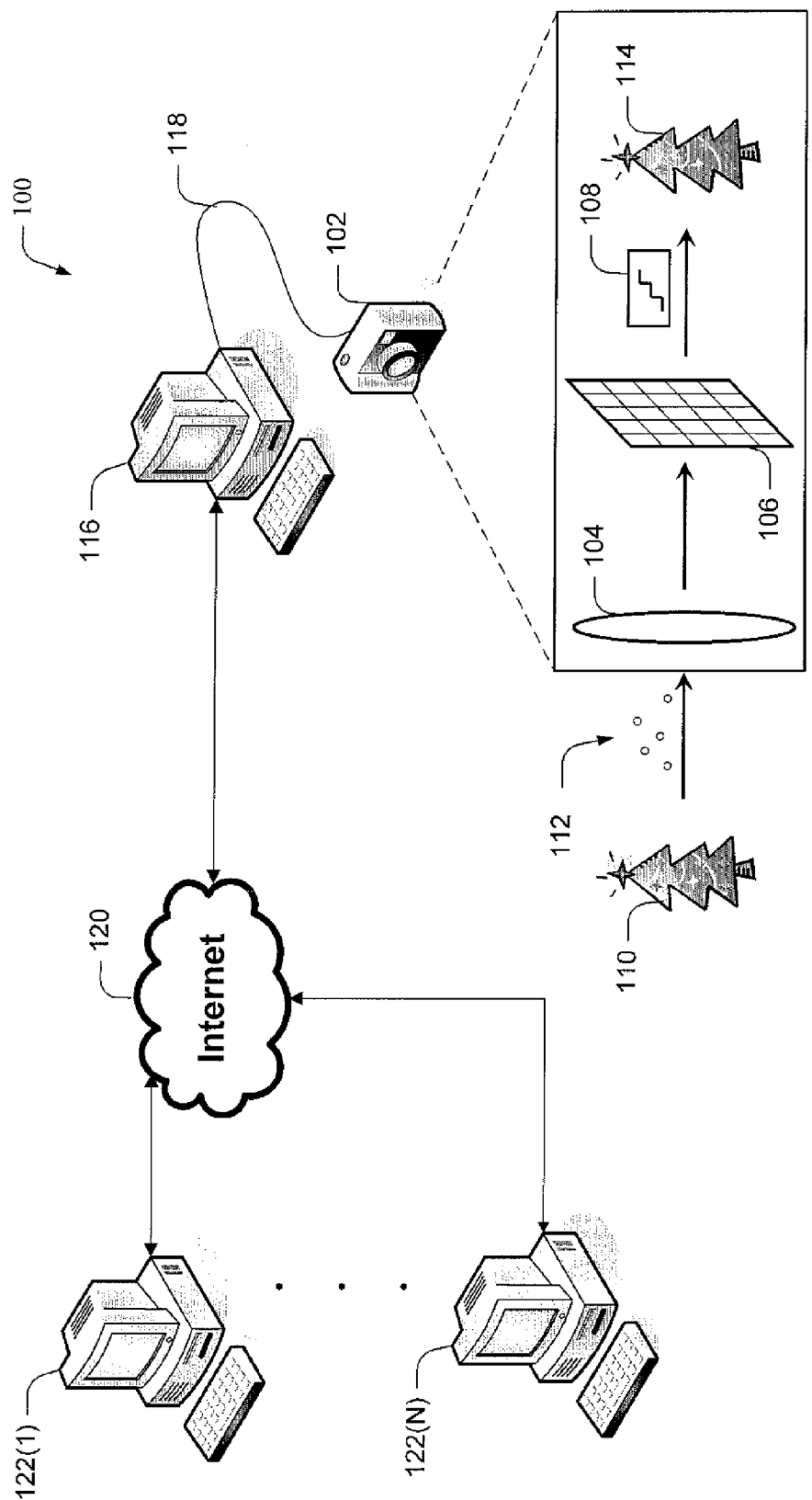
FIG. 1 illustrates an exemplary system, including a video content analysis engine, for video content analysis.

FIG. 1 illustrates an exemplary system 100 for processing video content. In one implementation, system 100 may be used to calculate Poisson-quantization noise using a Poisson-quantization noise model. In one implementation, the calculated Poisson-quantization noise is utilized to create an intensity similarity measure. The intensity similarity measure can be used to process video content captured by the system 100. For example, in one implementation, the intensity similarity measure is used to find correspondence among video images.

System 100 includes an imaging device such as a camera 102. Camera 102 includes optics 104, a photodetector 106, and a video content analysis engine 108. Although the imaging device is illustrated as a digital camera 102, the imaging device can also be any type of imaging device such as a conventional analog camera, a cell phone equipped with an imaging device, a personal digital assistant (PDA) equipped with an imaging device, a webcam, etc. Object image information captured by an imaging device typically includes photon noise 112 received by optics 104 and transmitted to photodetector 106. Photon noise 112 arises because photons do not arrive at optics 104 in a steady stream. Instead, photons arrive in a fluctuating manner consistent with that of a Poisson noise model. This temporal fluctuation in the intensity of photons arriving at photodetector 106 becomes especially significant in low-light conditions where the number of incoming photons is limited.

In addition to photon noise 112, other types of noise, including quantization noise, can be encountered by camera 102. Quantization noise is created when the photodetector 106 digitizes input photon energy into quantized values, thus changing photons to electrons by converting the incident optical intensity to a detector current or signal. In photon-limited conditions photon noise and quantization noise become dominant due to the lack of intensity resolution in the limited dynamic range. Thus, quantization noise and photon noise may exert an especially deleterious effect on low-light vision applications such as night vision, medical imaging, underwater imaging, microscopic imaging, astronomical imaging, and/or other applications.

Other types of noise, in addition to photon noise 112 and quantization noise, such as reset noise, dark current noise and read-out noise may also be significant. In general, these types of noise have the potential to significantly degrade the quality of an image 114 formed in camera 102. In high-speed imaging, Poisson noise often becomes significant, and the combination of Poisson noise and quantization noise may contribute significantly to uncertainty in observations. Reset noise, dark current noise and read-out noise follow a Poisson distribution. Sometimes, however, read-out noise may also be modeled by Gaussian noise. This results since Gaussian noise with variance $\sigma^2$ and mean $\sigma^2$ is nearly identical to Poisson noise with mean $\sigma^2$ if $\sigma$ is sufficiently large. For instance, when operating camera 102 at room temperature and with a high read-out frequency, $\sigma$ may be sufficiently large to satisfy this condition.

Video content analysis engine 108 may be employed to effect image restoration in photon-limited images which would otherwise suffer from severe degradation. As discussed below, video content analysis engine 108 accomplishes this by: modeling photon noise 112, quantization noise, reset noise, dark current noise, and read-out noise; and creating an intensity similarity measure. These operations are useful in filtering various types of noise to improve the quality of image 114.

Computer 116 is illustrated as a desktop computer. However, computer 116 could alternately comprise a variety of other types of computer and computer-like devices, such as a notebook or portable computer, a tablet PC, a cell phone, a personal digital assistant (PDA), a workstation, a mainframe computer, a server, an Internet appliance, a set-top box, combinations thereof, and so on. In one implementation, video content analysis engine 108 is implemented on computer 116. In another implementation, a portion of video content analysis engine 108 resides on the computer 116, while another portion of video content analysis engine 108 resides on a computer readable medium outside of computer 116, or on a device separate from computer 116, such as camera 102.

Computer 116 is coupled to a network 120, such as the Internet, via any possible connection type known in the art, including telephone lines and ISDN lines. Moreover, other computers 122(1)-122(N) may be connected to the network 120. In this fashion, computers 122(1)-122(N) can share data and instructions with each other, and with computer 116. In one implementation, this includes sharing by computer 116 of video content captured by camera 102 and processed by the video content analysis engine 108 with computers 122(1)-122(N) over network 120. For example, in one implementation, camera 102 comprises a cell phone with an imaging device. In this example, images taken by the imaging device are processed by the video content analysis engine 108. These images may then be communicated to computer 116, network 120, or computers 122(1)-122(N).

An Exemplary Computing Device

Although not required, the systems and methods for creating a Poisson-quantization (PQ) noise model and an intensity similarity measure based on the PQ noise model are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware, software, firmware or combinations of hardware, software, firmware, etc.

Figure 2:
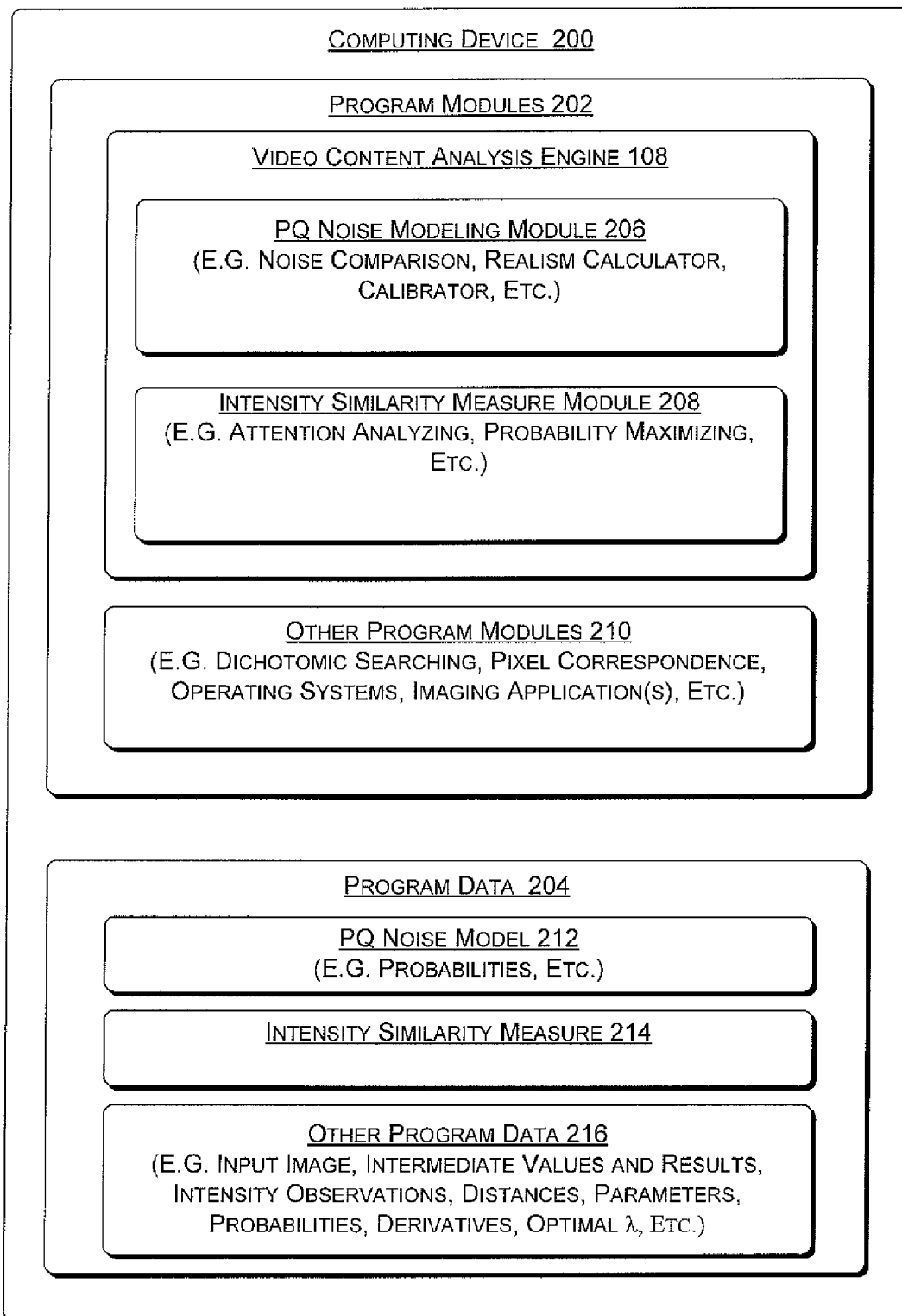
FIG. 2 is a block diagram of a computing device on which an exemplary video content analysis engine resides.

FIG. 2 illustrates an exemplary computing device 200 including program modules 202 and program data 204. Program modules 202 include the video content analysis engine 108. Video content analysis engine 108 includes PQ noise modeling module 206 and intensity similarity measure module 208. Program modules 202 also include other program modules 210 such as, an operating system, a pixel correspondence module, and one or more applications to perform denoising applications based on PQ noise model 212 generated by PQ noise modeling module 206, and/or an intensity similarity measure 214 generated by intensity similarity measure module 208. Program data 204 includes PQ noise model 212, intensity similarity measure 214 and other program data 216 such as, for example, input image data, intermediate values and results, and intensity observations.

Noise reduction in an image sequence may be accomplished by finding pixel correspondences among the images in the sequence. Once the correspondences are obtained, color/intensity values of the pixels are smoothed by selecting an average or median value for the color/intensity values of corresponding pixels found in images within the sequence. In this manner, noise in the images can be reduced.

The intensity similarity measure module 208 is useful for finding pixel correspondences in low-light conditions, because the intensity similarity measure is built upon the physics-based noise model, i.e., PQ noise model 212. To compute the intensity similarity measure 214, parameters q and $q_1$ of PQ noise model 212 are determined. This is achieved by fitting the observed noise data in the calibration stage, as will be described in more detail below. Once the parameters q and $q_1$ for the PQ noise model 212 are obtained, the intensity similarity measure 214 may be obtained. Methods describing how to obtain the similarity measure 214 are also discussed in more detail below. It will be understood that if gain and white balancing parameters in the images are fixed, such computations need only be completed once.

Below, PQ noise model 212, which is a realistic noise model in low-light conditions, is derived. The PQ noise model 212 is built upon two inevitable noise sources in low-light conditions: Poisson noise and quantization noise. The PQ noise model 212 accounts for uncertainties caused by the nature of photon arrival, as well as by the digitizing process carried out at the photodetector 106. Intensity similarity measure 214 is based on PQ noise model 212. Intensity similarity measure 214 is useful in many computer vision applications which involve intensity differencing, e.g., block matching, stereo, optical flow and image alignment. Intensity similarity measure 214 can replace existing intensity distance functions based on Euclidean distance.

Poisson-Quantization Noise Model

As mentioned above, the quality of video content captured by camera 102 may suffer from uncertainty generated by photon noise 112 and quantization noise. The Poisson-quantization (PQ) noise model 212 discussed below accounts for this uncertainty.

Poisson Noise Model

Poisson noise is modeled by a Poisson distribution with parameter $\lambda$ defined for all $k \in N$ by the probability:

$$p(k, \lambda) = \frac{\lambda^k}{k!} e^{-\lambda}, \tag{1}$$

wherein the mean E and variance V are defined as follows:

$$E(\lambda) = \sum_{k=0}^{\infty} k p(k, \lambda) = \lambda, \; V(\lambda) = \sum_{k=0}^{\infty} k^2 p(k, \lambda) - E^2 = \lambda. \tag{2}$$

Quantization Noise Model

As also noted above, quantization noise is the uncertainty caused when observed amplitudes in image data are rounded to discrete levels in photodetector 106. This arises due to the finite amplitude resolution inherent in any digital system (i.e. in analog-to-digital conversion, assuming that a signal lies within a predefined range).

If the minimum number of electrons necessary to raise one level of observed intensity is q, and $e_q$ is the quantization noise, then the count of electrons is proportional to the number of photons by the factor of the photon-electron conversion efficiency (the quantum efficiency of the sensor). Quantization noise can thus be modeled as:

$$e_q = \frac{N}{q} - \left\lfloor \frac{N}{q} \right\rfloor, \quad (3)$$

where N is the number of electrons generated by the measurement. More detailed quantization error analysis in computer vision can be found in "Evaluation of Quantization Error in Computer Vision" by B. Kamgar-Parsi and B. Kamgar-Parsi, as found in *IEEE Trans. Pattern Anal. Mach. Intell.*, 11(9):929 940, 1989, which is incorporated herein by reference.

Poisson-Quantization Noise Model

Given the Poisson noise model and the quantization noise model discussed above, the PQ-noise model 212 can be formed as follows. A Poisson distribution with parameter $\lambda$ and quantization $Q=\{q_0=0, \ldots, q_k, \ldots, q_{n+1}\infty\}$ may be defined for all $k\in\{0,\ldots,n\}$ by the probability $p(k,\lambda,Q)$ as:

$$p(k, \lambda, Q) = \sum_{i=q_\lambda}^{q_{k+1}-1} \frac{\lambda^i}{i!} e^{-\lambda}. \quad (4)$$

where the quantization parameter $q_k$ represents the minimum number of electrons used to produce an intensity level k.

In one implementation, the quantization interval is considered constant, i.e. $q_k = kq$, and the observations are considered to be far from saturation. In such an instance, the quantization interval can be defined as the range of input values assigned to the same output level, and the behavior of the PQ-noise model 212 can be seen to differ from the behavior of the Poisson noise model.

To derive the mean $E(\lambda,q)$ and variance $V(\lambda,q)$ of the PQ-noise model 212, $X \in Z$ is considered to be a discrete random variable having a characteristic function $\phi(t) = E(e^{itX})$. The quantized version $X_q$ can thus be defined by:

$$X_q = \left\lfloor \frac{X}{q} \right\rfloor.$$

Moreover, the characteristic function $\phi_q$ of $X_q$ may be given by:

$$\phi_q(t) = \frac{1 - e^{-it}}{q} \sum_{k=0}^{q-1} \frac{\phi\left(\frac{t+2\pi k}{q}\right)}{1 - e^{-i\frac{t+2\pi k}{q}}}.$$

This can be proven by setting $p_n = P(X=n)$. The characteristic function $\phi_q$ of $X_q$ is therefore:

$$\phi_q(t) = \sum_{n=-\infty}^{\infty} p_n e^{i\lfloor\frac{n}{q}\rfloor t} = \sum_{n=-\infty}^{\infty} p_n e^{i\frac{n}{q}t} e^{i(\lfloor\frac{n}{q}\rfloor - \frac{n}{q})t}.$$

Since the function:

$$f: \begin{cases} Z| \to C \\ n \to e^{i(\lfloor\frac{n}{q}\rfloor - \frac{n}{q})t} \end{cases}$$

is q-periodic, it can therefore be written as a trigonometric polynomial:

$$\sum_{k=0}^{q-1} a_k e^{i\frac{2\pi k n}{q}}.$$

Using a discrete Fourier transformation, it can be shown that:

$$a_k = \frac{1}{q}\sum_{j=0}^{q-1} f(j) e^{-i\frac{2\pi jk}{q}}$$

$$= \frac{1}{q}\sum_{j=0}^{q-1} e^{-i\frac{j}{q}t} e^{-i\frac{2\pi jk}{q}}$$

$$= \frac{1}{q}\sum_{j=0}^{q-1} e^{-i\frac{j(t+2\pi k)}{q}}$$

$$= \frac{1 - e^{-i(t+2\pi k)}}{q\left(1 - e^{-i\frac{t+2\pi k}{q}}\right)}$$

$$= \frac{1 - e^{it}}{q\left(1 - e^{-i\frac{t+2\pi k}{q}}\right)}.$$

Therefore, $$\phi_q(t) = \sum_{n=-\infty}^{\infty} p_n e^{i\frac{n}{q}t} \sum_{k=0}^{q-1} a_k e^{i\frac{2\pi kn}{q}}$$

$$= \sum_{k=0}^{q-1} \sum_{n=-\infty}^{\infty} p_n e^{in\frac{t+2\pi k}{q}} \frac{1 - e^{-it}}{q\left(1 - e^{-i\frac{t+2\pi k}{q}}\right)}$$

$$= \sum_{k=0}^{q-1} \phi\left(\frac{t+2\pi k}{q}\right) \frac{1 - e^{-it}}{q\left(1 - e^{-i\frac{t+2\pi k}{q}}\right)}.$$

Corollary 1. The mean $E_q$ of $X_q$ and variance $V_q$ of $X_q$ can be written by the mean E, the variance V, and the characteristic function $\phi$ of X as:

$$E_q = \frac{E}{q} - \frac{1}{2} + \frac{1}{2q} + \frac{1}{q}\sum_{k=1}^{q-1}\frac{\phi(2\pi k/q)}{1-e^{-i\frac{2\pi k}{q}}}$$

$$V_q = \frac{V}{q} + \frac{1}{12} - \frac{1}{12q^2} - \frac{2E}{q^2}\sum_{k=1}^{q-1}\frac{e^{i\frac{2\pi k}{q}}\phi(2\pi k/q)}{1-e^{-i\frac{2\pi k}{q}}} +$$

$$\frac{2}{q^2}\sum_{k=1}^{q-1}\frac{e^{-i\frac{2\pi k}{q}}\phi(2\pi k/q)}{\left(1-e^{-i\frac{2\pi k}{q}}\right)^2} + \frac{1}{q}\sum_{k=1}^{q-1}\frac{\phi(2\pi k/q)}{1-e^{-i\frac{2\pi k}{q}}} - \frac{1}{q^2}\left(\sum_{k=1}^{q-1}\frac{\phi(2\pi k/q)}{1-e^{-i\frac{2\pi k}{q}}}\right)^2.$$

These formulas result from a computation of the derivatives of $\phi_q$, using the fact that $E_q = -i\phi_q'(0)$ and $V_q = -\phi_q''(0) - E_q^2$.

Further, by using a Poisson distribution having the characteristic function $\phi(t) = e^{\lambda(e^{it}-1)}$ the following formulas are obtained:

$$E(\lambda, q) = \frac{\lambda}{q} - \frac{1}{2} + \frac{1}{2q} + \frac{1}{q}\sum_{k=1}^{q-1}\frac{e^{\lambda(e^{i\frac{2\pi k}{q}}-1)}}{1-e^{-i\frac{2\pi k}{q}}} \quad (5)$$

$$V(\lambda, q) = \frac{\lambda}{q} + \frac{1}{12} - \frac{1}{12q^2} - \frac{2\lambda}{q^2}\sum_{k=1}^{q-1}\frac{e^{i\frac{2\pi k}{q}}e^{\lambda(e^{i\frac{2\pi k}{q}}-1)}}{1-e^{-i\frac{2\pi k}{q}}} + \quad (6)$$

$$\frac{2}{q^2}\sum_{k=1}^{q-1}\frac{e^{-i\frac{2\pi k}{q}}e^{\lambda(e^{i\frac{2\pi k}{q}}-1)}}{1-e^{-i\frac{2\pi k}{q}}} + \frac{1}{q}\sum_{k=1}^{q-1}\frac{e^{\lambda(e^{i\frac{2\pi k}{q}}-1)}}{1-e^{-i\frac{2\pi k}{q}}} - \frac{1}{q^2}\left(\sum_{k=1}^{q-1}\frac{e^{\lambda(e^{i\frac{2\pi k}{q}}-1)}}{1-e^{-i\frac{2\pi k}{q}}}\right)^2.$$

Remark 1. This result can be extended to the continuous random variable case by allowing X to be a random variable in $\Re$, and by allowing $\phi_x(t)$ to be the characteristic function of X. $\lfloor X \rfloor$ can then be allowed to be the quantized version of X. Through use of the Fourier series of the 1-periodic function defined over $\Re$, i.e.:

$$f(x) = e^{it(\lfloor x \rfloor - x)} = \sum_{n=-\infty}^{\infty} i\frac{e^{-i(t+2\pi n)}-1}{t+2\pi n}e^{2i\pi nx},$$

it can be shown that show that the characteristic function $\phi_{\lfloor X \rfloor}$ of $\lfloor X \rfloor$ is $$\phi_{\lfloor X \rfloor}(t) = \sum_{n=-\infty}^{\infty} i\frac{e^{-i(t+2\pi n)}-1}{t+2\pi n}\phi_X(t+2\pi n),$$

where the summation is done by grouping terms of n and −n together if no convergence is present. The mean $E_{\lfloor X \rfloor}$ can be derived by:

$$E_{\lfloor X \rfloor} = E_X - \frac{1}{2} + \sum_{n\neq 0}\frac{\phi_X(2\pi n)}{2\pi n}.$$

This applies to any kind of distribution, for example, the mean of a Gaussian distribution can be derived by allowing X to be a random variable following the Gaussian law $N(\mu, \sigma^2)$. The characteristic function becomes $$\phi_X(t) = e^{i\mu t - \frac{\sigma^2 t^2}{2}}.$$

Therefore, $$E_{\lfloor X \rfloor} = \mu - \frac{1}{2} + \sum_{n\neq 0}\frac{e^{i\mu 2\pi n - 2\sigma^2 \pi^2 n^2}}{2\pi n} = \mu - \frac{1}{2} + \sum_{n=1}^{\infty}\frac{\cos(2\pi n\mu)e^{-2\sigma^2\pi^2 n^2}}{\pi n}$$

As the series on the right decreases exponentially with n, a practical way to compute $E_{\lfloor X \rfloor}$ is achieved.

Figure 3:
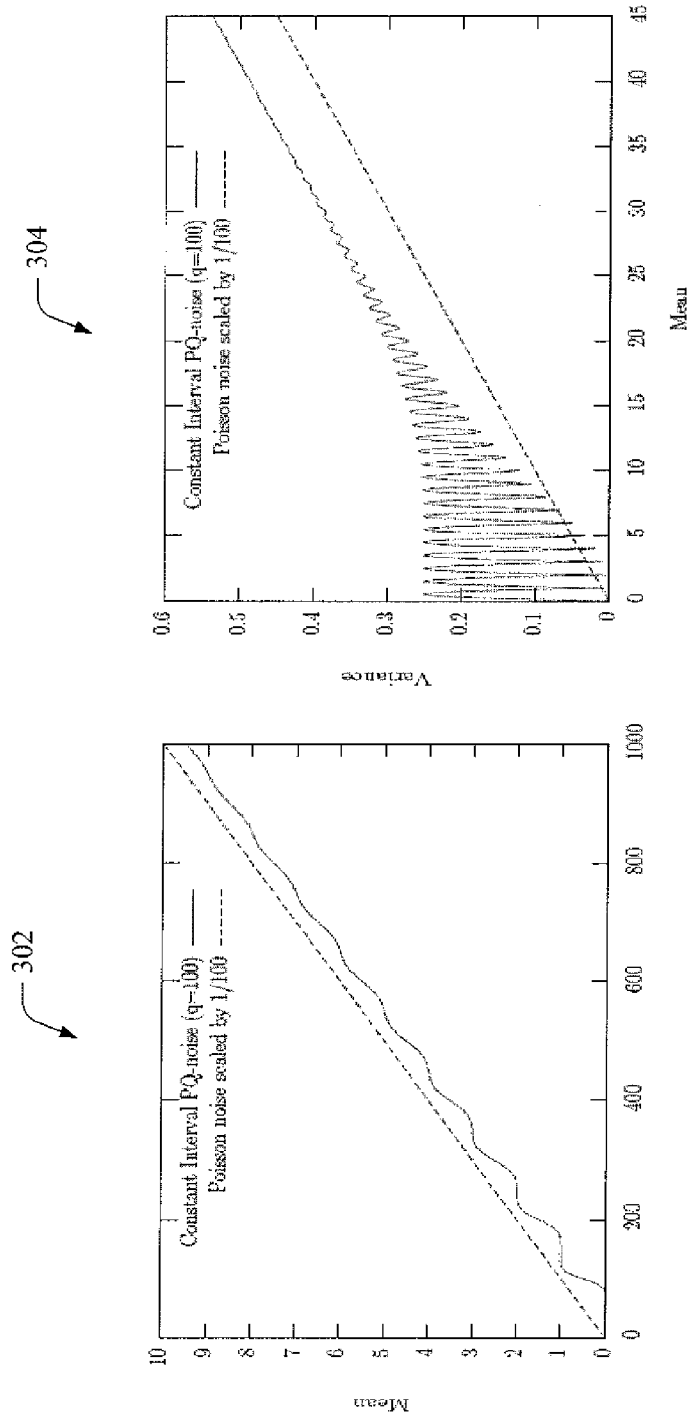
FIG. 3 includes two graphs illustrating exemplary mean and variance properties of Poisson-quantization noise.

FIG. 3 illustrates the differences between the ordinary Poisson (P) noise model and the PQ-noise model 212 (as delineated by the mean and variance equations shown above). In graph 302, evolution of the mean with respect to $\lambda$ with q=100 for both P noise and PQ noise is shown. Due to quantization noise, strong oscillations are observed in the mean of the PQ noise, while the mean of the p noise is nearly linear with respect to $\lambda$.

Similarly, graph 304 illustrates the evolution of the variance of both P noise and PQ noise with respect to the mean, with q=100. Again, due to quantization noise, strong oscillations are observed in the mean of the PQ noise, while the variance of P noise exhibits a near linear relationship with the mean of P noise.

The oscillation in the mean of PQ noise in graph 302, and the variance of PQ noise in graph 304, decays exponentially according to the formula:

$$e^{-\lambda\left(1-\cos\frac{2\pi}{q}\right)}$$

The minimum intensity level of the linear range corresponds to:

$$\lambda \propto \frac{1}{1-\cos\frac{2\pi}{q}} \approx \frac{q^2}{2\pi^2}.$$

In practice, $q_1$ does not equal q due to the shift of the function caused by the offset voltage. However, under the PQ noise model 212, with the assumption that $q_0=0$ and $q_k=q_1+(k-1)q$ it is possible to derive $E(\lambda,q)$ and $V(\lambda,q)$ for this condition by the same derivation used for Eqs. (5) and (6) above. Thus, when $E(\lambda,q)$ is reasonably high, i.e. when $$E(\lambda, q) \gg \frac{q}{2\pi^2},$$

The following relationship between $E(\lambda,q)$ and $V(\lambda,q)$ holds in the linear range:

$$V(E, q, q_1) = \frac{E}{q} + \frac{q^2 + 12q_1 - 6q - 7}{12q^2}. \quad (7)$$

This results because it may be assumed that observed intensities are far enough from saturation that the approximation $n=\infty$ may be used. By bifurcating the problem, two cases are formed.

Case 1. If $q_1 \leq q$, and $X(\lambda)$ is a discrete random variable on the shifted Poisson distribution defined by:

$$\forall k \geq q_1 - q \quad P(X(\lambda) = k) = \frac{\lambda^{k+q_1-q}}{(k+q_1-q)!} e^{-\lambda}$$

then, $$\left\lfloor \frac{X(\lambda)}{q} \right\rfloor$$

possesses the desired PQ-distribution. It can thus be seen that $E_{X(\lambda)} = \lambda + q_1 - q$, and $V_{X(\lambda)} = \lambda$.

Case 2. If $q_1 > q$, and $X(\lambda)$ is a discrete random variable which satisfies $$\begin{cases} P(X(\lambda) = 0) = \sum_{j=0}^{q_1-q} \frac{\lambda^j}{j!} e^{-\lambda}, \\ P(X(\lambda) = k) = \frac{\lambda^{k+q_1-q}}{(k+q_1-q)!} e^{-\lambda}, \quad \forall k \geq 1 \end{cases}$$

then $$\left\lfloor \frac{X(\lambda)}{q} \right\rfloor$$

has the desired PQ-distribution. When $\lambda$ is large, the approximation $P(X=0) \approx 0$ holds. Therefore, $E_{X(\lambda)} \approx \lambda + q_1 - q$, and $V_{X(\lambda)} \approx \lambda$ are deduced.

Using Corollary 1 and Remark 1, which show that $$\lim_{\lambda \to \infty} \phi_{X(\lambda)}(2k\pi) = \lim_{\lambda \to \infty} \phi'_{X(\lambda)}(2k\pi) = 0,$$

it can be deduced that:

$$E(\lambda, q, q_1) = \frac{\lambda + q_1}{q} - \frac{1}{2} + \frac{1}{2q} \text{ and } V(\lambda, q, q_1) = \frac{\lambda}{q^2} + \frac{1}{12} - \frac{1}{12q^2}$$

in the linear range. Therefore:

$$V(\lambda, q, q_1) = \frac{qE(\lambda, q, q_1) - q_1 + q/2 - 1/2}{q^2} + \frac{1}{12} - \frac{1}{12q^2}$$

$$= \frac{E(\lambda, q, q_1)}{q} + \frac{q^2 + 12q_1 - 6q - 7}{12q^2}.$$

The PQ noise model has two unknown parameters: q and $q_1$. These unknown parameters can be calibrated by fitting the observed noise data to Eq. (7) above.

Intensity Similarity Measure

The similarity between two intensity observations k and l is often measured by Euclidean distance with an assumption that k and l are true signals, or the noise model being employed is non-biased. Such assumptions, however, do not hold in low-light conditions. In contrast, intensity similarity measure 214 is based on the probability that two intensity observations come from the same source intensity. For the sake of clarity, the intensity similarity measure for the Poisson noise case will be derived before intensity similarity measure 214 for the PQ-noise model 212 is derived. It will be understood that the Poisson noise model can be considered as a special case of the PQ noise model 212 in which the quantization parameters $q=q_1=1$.

Poisson Noise Case

In the Poisson noise model, when two observed intensities arise from the same intensity distribution, it can be assumed that two observed intensities share the same parameter $\lambda$. Given this, the probability of obtaining two observations k and l is $$P(k, l, \lambda) = p(k, \lambda)p(l, \lambda) = \frac{\lambda^{k+l}}{k!l!} e^{-2\lambda}. \tag{8}$$

Since parameter $\lambda$ is unknown, the actual probability may not be calculable. However, by viewing the optimal case where $\lambda$ maximizes the probability, the measure which maximizes the similarity between k and l may be found. This approach corresponds to the ML estimation of the observation of the pair (k,l). Therefore, the optimal $\hat{\lambda}$ can be obtained by setting the first derivative to zero:

$$\frac{\partial P}{\partial \lambda} = 0, \text{ such that } \hat{\lambda} = \frac{k+l}{2}, \tag{9}$$

is obtained. Eq. 9 maximizes the probability defined in Eq. (8). In this way, the intensity similarity function can be defined as:

$$d(k, l) = -\ln(P(k, l, \hat{\lambda})) \tag{10}$$

$$= (k+l)\left(1 - \ln\left(\frac{k+l}{2}\right)\right) + \ln(k!) + \ln(l!).$$

This similarity measure does not agree with the exact definition of distance, because $d(k,k) > 0$ if $k > 0$. However, the similarity measure does produce the similarity between two observations.

Figure 4:
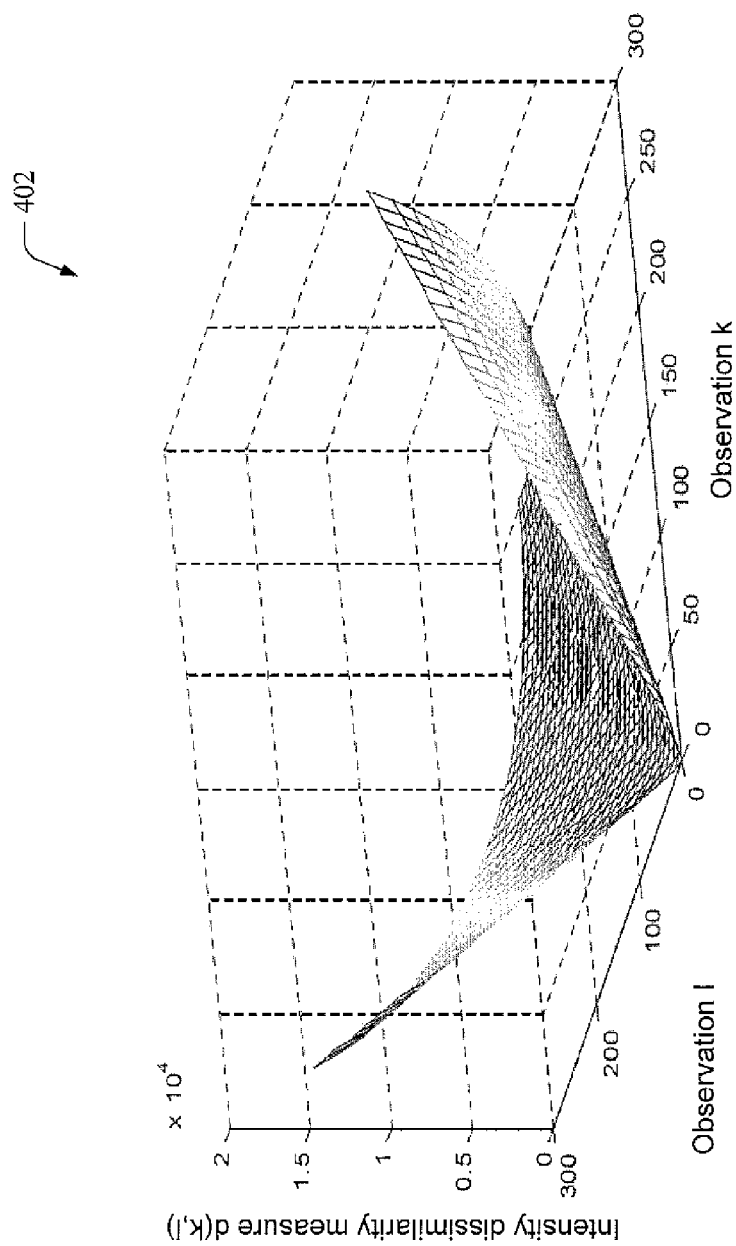
FIG. 4 illustrates an exemplary intensity similarity function for the Poisson noise model.

FIG. 4 illustrates the intensity similarity function defined in Eq. (10) in graphed function 402. Graphed function 402 is similar to the $l^2$ norm when two observed intensity levels are high. In fact, when k and l are sufficiently large, d(k,l) has a connection to the squared $l^2$ norm. This can be shown by rewriting Eq. (10) with the approximation $\ln(k!) \approx k \ln(k) - k$:

$$d(k, l) \approx k \ln(k) + l \ln(l) - (k+l) \ln\left(\frac{k+l}{2}\right) \tag{11}$$

$$= f(k) + f(l) - 2f\left(\frac{k+l}{2}\right)$$

$$\approx \frac{f''\left(\frac{k+l}{2}\right)(k-l)^2}{4}$$

$$\approx \frac{(k-l)^2}{2(k+l)}.$$

Poisson-Quantization Noise Case

Using the derivation in the previous section, the intensity similarity function for the PQ-noise model 212 may be formalized. The joint probability P is defined as the probability of observing k and l having parameters $\lambda_k$ and $\lambda_l$ respectively with the quantization Q, by $$P(k,l,\lambda_k,\lambda_l,Q) = p(k,\lambda_k,Q) p(l,\lambda_l,Q) \qquad (12)$$

Parameter $\hat{\lambda}$ ($=\lambda_k=\lambda_l$), which maximizes the probability P, is first determined. This is equivalent to maximizing the probability that two intensity observations share the same intensity source. When $\lambda_k=\lambda_l$, it can be said that $P(k,l,\lambda,Q)=P(k,l,\lambda_k,\lambda_l,Q)$. The optimal $\hat{\lambda}$ exists since the logged probability $-\ln P$ is convex.

Convexity of the logged probability $-\ln P$ in Eq. (12) can be shown by the following:

Proposition:

$$f: \lambda \mapsto -\ln\left(\sum_{i=m}^{n} \frac{\lambda^i}{i!} e^{-\lambda}\right)$$

is convex.

Proof $$f'(\lambda) = \frac{-\sum_{i=m}^{n}\left(\frac{\lambda^{i-1}}{(i-1)!} - \frac{\lambda^i}{i!}\right)e^{-\lambda}}{\sum \frac{\lambda^i}{i!} e^{-\lambda}}$$

$$= \frac{\frac{\lambda^n}{n!} - \frac{\lambda^{m-1}}{(m-1)!}}{\sum \frac{\lambda^i}{i!}}$$

$$f''(\lambda) = \frac{\sum_{i=m}^{n}\left(\frac{\lambda^{n-1}}{(n-1)!} - \frac{\lambda^{m-2}}{(m-2)!}\right)\frac{\lambda^i}{i!} - \left(\frac{\lambda^n}{n!} - \frac{\lambda^{m-1}}{(m-1)!}\right)\frac{\lambda^{i-1}}{(i-1)!}}{\left(\sum \frac{\lambda^i}{i!}\right)^2}$$

$$= \frac{\sum_{i=m}^{n} \frac{\lambda^{n+i-1}}{n!i!}(n-i) + \frac{\lambda^{m+i-2}}{(m-1)!i!}(i-m+1)}{\left(\sum \frac{\lambda^i}{i!}\right)^2} > 0.$$

Therefore, f is convex.

Returning to the formalization of the intensity similarity function for the PQ-noise model 212:

(1). If k=l, the maximum of $P(k,k,\lambda,Q)$ is given by $$\hat{\lambda} = (q_k \dots (q_{k+1} - 1)) \frac{1}{q_{k-1}^{-1} - q_k^{-1}} \qquad (13)$$

This can be derived from the first derivation of the function described above in the proof of the convexity of the logged probability $-\ln P$.

(2). If k≠l, the optimal $\hat{\lambda}$ may be obtained by minimizing the convex function $-\ln P$. This can be accomplished by describing a simple algorithm for finding the optimal $\hat{\lambda}$ with a dichotomic search over the first derivative of P.

Algorithm for finding the optimal $\hat{\lambda}$

Inputs are $k, l, q_k, q_{k+1}, q_l, q_{l+1}$ and $n_{iter}$.

Set $\lambda_{min} = 0$ and $\lambda_{max}$ sufficiently big, and $n = 0$,

While $n < n_{iter}$ and $P' \neq 0$ do

Set $\lambda \leftarrow \frac{\lambda_{min} + \lambda_{max}}{2}$ and $N \leftarrow n+1$.

Compute $P' = -\frac{\partial \ln(P(k, l, \lambda, Q))}{\partial \lambda}$

If $P' < 0$ set $\lambda_{min} \leftarrow \lambda$.

If $P' < 0$ set $\lambda_{max} \leftarrow \lambda$.

done

Set $\hat{\lambda} \leftarrow \lambda$.

The sign of P' can be determined by computing the sign of:

$$\left(\frac{\lambda^{q_{k+1}-1}}{(q_{k+1}-1)!} - \frac{\lambda^{q_k-1}}{(q_k-1)!}\right) \sum_{i=q_l}^{q_{l+1}-1} \frac{\lambda^i}{i!} + \left(\frac{\lambda^{q_{l+1}-1}}{(q_{l+1}-1)!} - \frac{\lambda^{q_l-1}}{(q_l-1)!}\right) \sum_{i=q_k}^{q_{k+1}-1} \frac{\lambda^i}{i!} \quad (A)$$

Alternately, to find the optimal $\hat{\lambda}$, other descent methods such as gradient descent, Newton-Raphson, etc. can also be used.

The intensity similarity function is finally determined by plugging in the optimal $\hat{\lambda}$ into the following function using Eqs. (4) and (12):

$$d(k, l, Q) = \min_\lambda\{-\ln(P(k, l, \lambda, Q))\} \qquad (14)$$

$$= -\ln P(k, l, \hat{\lambda}, Q)$$

$$= -\ln\left\{e^{-2\hat{\lambda}} \left(\sum_{i=q_k}^{q_{k+1}-1} \frac{\hat{\lambda}^i}{i!}\right)\left(\sum_{j=q_l}^{q_{l+1}-1} \frac{\hat{\lambda}^j}{j!}\right)\right\}$$

An Exemplary Procedure to Process Video Content

Figure 5A:
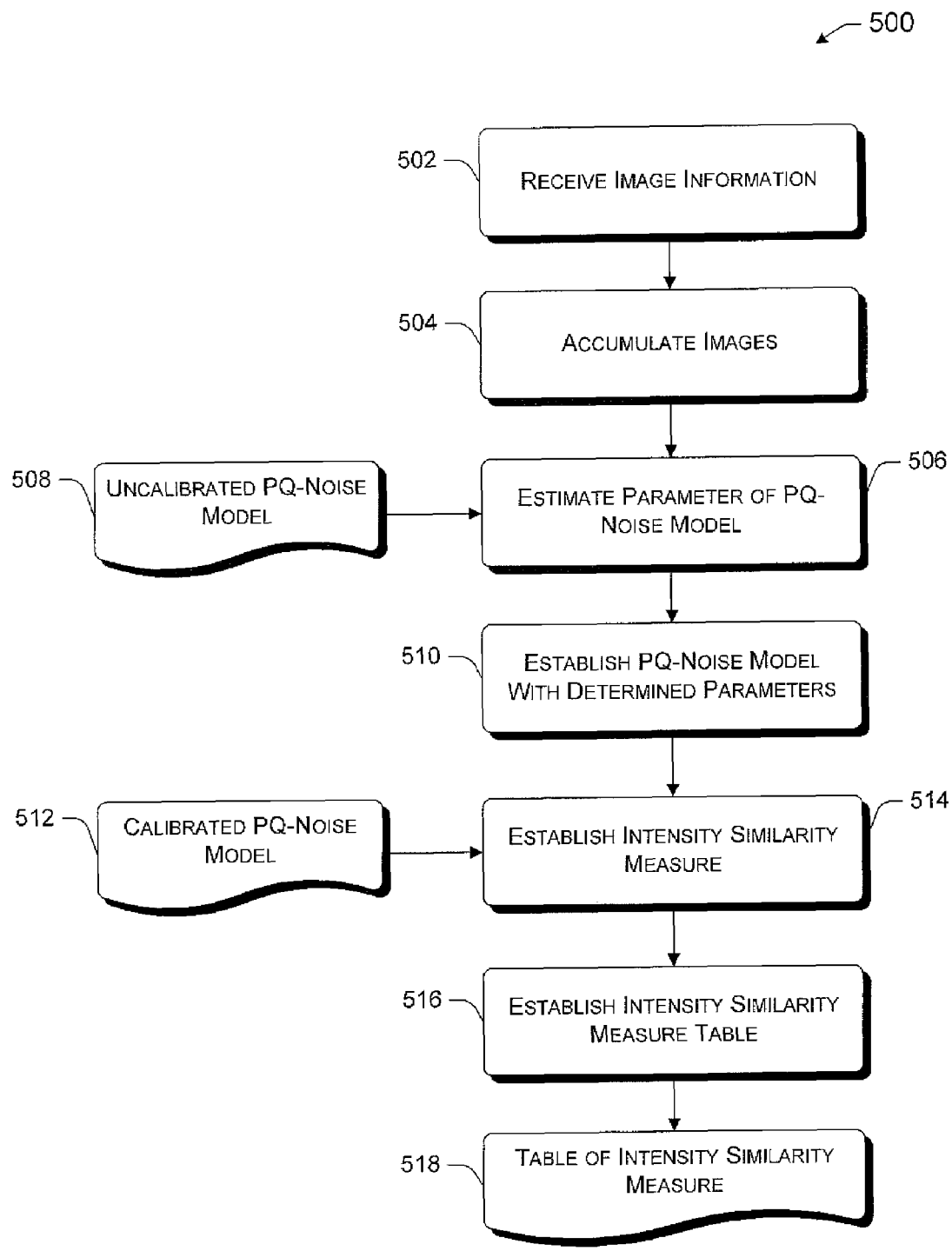
FIG. 5 is a flow diagram of an exemplary method to identify pixel correlation between two frames of image information.

FIG. 5a shows an exemplary procedure 500 to create a table of intensity similarity measure. For ease of understanding, the method 500 is delineated as separate steps represented as independent blocks in FIG. 5a; however, these separately delineated steps should not be construed as necessarily order dependent in their performance. Additionally, for discussion purposes, the method 500 is described with reference to elements in FIGS. 1-2. This flow diagram may be implemented in any suitable hardware, software, firmware, or combination thereof. In the case of software and firmware, this diagram represents sets of operations implemented as computer-executable instructions. The left-most digit of a component reference number identifies the particular figure in which the component first appears.

At block 502, image information is received. For example, video information is collected using camera 102, or any other suitable photographic device. Alternately, camera 102, or any other suitable photographic device, can be used to collect several still frames of an object of interest.

At block 504, the image information received at block 502 is accumulated and stored. The accumulation of images can include, for example, a collection of approximately 1000 images. It will also be understood, however, that more or less images may be accumulated at block 504. The accumulation may be stored at any suitable memory device, including memory associated with computer 116, camera 102 or video content analysis engine 108.

At block 506, the accumulated image information stored at block 504 is used to calibrate an uncalibrated Poisson-quantization (PQ) noise model (block 508):

$$p(k, \lambda, Q) = \sum_{i=q_k}^{q_{k+1}-1} \frac{\lambda^i}{i!} e^{-\lambda} \quad (4)$$

where the quantization parameter $q_k$ represents the minimum number of electrons which produce an intensity level k. The PQ noise model has two unknown parameters: q and $q_1$. In practice, $q_1$ does not equal q due to the shift of the function caused by the offset voltage. However, these unknown parameters can be estimated by fitting the observed noise data to Eq. (7) below (block 506):

$$V(E, q, q_1) = \frac{E}{q} + \frac{q^2 + 12q_1 - 6q - 7}{12q^2}. \quad (7)$$

Once the parameters q and $q_1$ have been estimated, they are used in conjunction with Eq. 4 to establish a calibrated PQ-noise model with determined parameters q and $q_1$ (block 510).

This calibrated PQ noise model with determined parameters q and $q_1$ (block 512) is then used to establish the intensity similarity measure (block 514). The intensity similarity measure is calculated based on the probability that intensity observations come from the same source intensity. In one implementation, the intensity similarity measure is calculated from an intensity similarity function obeying the formula:

$$d(k, l, Q) = \min_{\lambda}\{-\ln(P(k, l, \lambda, Q))\} \quad (14)$$
$$= -\ln P(k, l, \hat{\lambda}, Q)$$
$$= -\ln\left\{ e^{-2\hat{\lambda}} \left(\sum_{i=q_k}^{q_{k+1}-1} \frac{\hat{\lambda}^i}{i!}\right)\left(\sum_{j=q_l}^{q_{l+1}-1} \frac{\hat{\lambda}^j}{j!}\right) \right\}$$

Once calculated, the intensity similarity measure is used to establish an intensity similarity measure table (block 516). When creating an intensity similarity measure table (block 516) the intensity similarity is computed for each combination of observations k and l. Therefore, the table becomes a symmetric square matrix where the number of rows and columns is the number of discrete observations, e.g., when the range of observation is 0-255, the number of rows and columns becomes 256. Once created, the intensity similarity table (block 518) provides an intensity similarity measure for two intensity observations. For instance, when two intensity values k and l are observed, the intensity similarity can be measured by looking up the intensity similarity measure table 518.

An Exemplary Procedure to Process Video Content

FIG. 5b shows an exemplary procedure 530 to find pixel correspondence between two frames of image information. For ease of understanding, the method 500 is delineated as separate steps represented as independent blocks in FIG. 5b; however, these separately delineated steps should not be construed as necessarily order dependent in their performance. Additionally, for discussion purposes, the method 530 is described with reference to elements in FIGS. 1-2 and 5a. This flow diagram may be implemented in any suitable hardware, software, firmware, or combination thereof. In the case of software and firmware, this diagram represents sets of operations implemented as computer-executable instructions. The left-most digit of a component reference number identifies the particular figure in which the component first appears.

Once the table of intensity measure 518 has been created, it may be used to find pixel correspondences between two images. For example, at block 532, image information is received. This image information may be the same image information received at block 502 in method 500, or it may be new image information. Also the image information may include video information collected using camera 102, or any other suitable photographic device. Alternately, in another possible implementation, camera 102, or any other suitable photographic device, can be used to collect several still frames of an object of interest.

At block 534 two frames from either the video information or the collection of still frames are chosen.

At block 536 the two frames are compared using the pre-calculated table of intensity similarity measure (block 518), and pixel correspondence between the two frames may be found using block matching optical flow estimation, or any other suitable method known in the art.

An Exemplary Procedure to Create a PQ Noise Model

Figure 6:
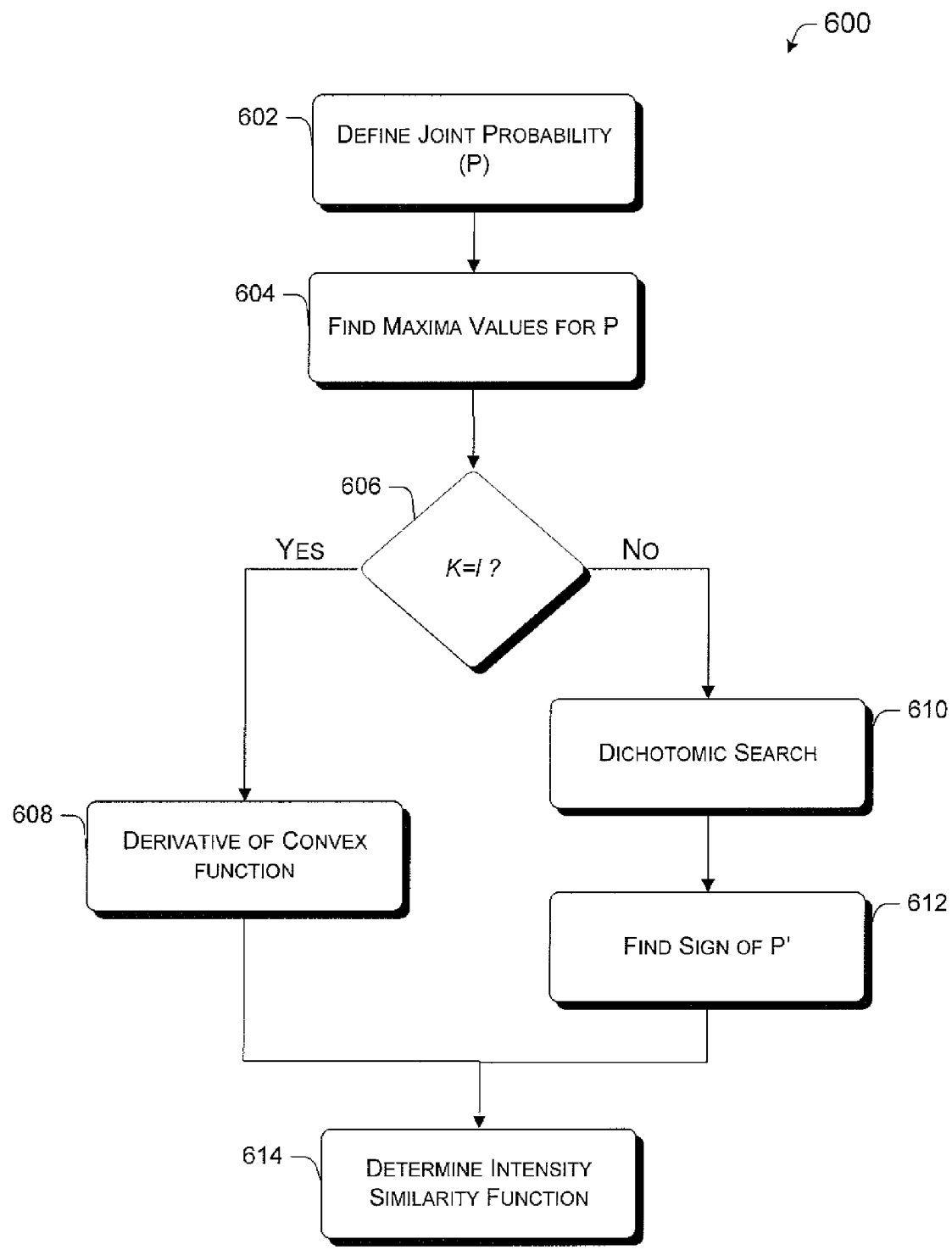
FIG. 6 is a flow diagram of an exemplary method to determine an intensity similarity function.

FIG. 6 shows an exemplary procedure 600 to derive an intensity similarity measure. For ease of understanding, the method 600 is delineated as separate steps represented as independent blocks in FIG. 6; however, these separately delineated steps should not be construed as necessarily order dependent in their performance. Additionally, for discussion purposes, the method 600 is described with reference to elements in FIGS. 1-2. This flow diagram may be implemented in any suitable hardware, software, firmware, or combination thereof. In the case of software and firmware, this diagram represents sets of operations implemented as computer-executable instructions. The left-most digit of a component reference number identifies the particular figure in which the component first appears.

Method 600 is used to derive an intensity similarity measure based upon the probability that two intensity observations come from the same source intensity. At block 602, the joint probability P of observing two intensity observations k and l having parameters $\lambda_k$ and $\lambda_l$ respectively with the quantization Q, is defined by:

$$P(k,l,\lambda_k,\lambda_l,Q)=p(k,\lambda_k,Q)p(l,\lambda_l,Q) \quad (12)$$

At block 604, maxima of Joint probability P are isolated such that $\hat{\lambda}$ ($=\lambda_k=\lambda_l$). This is equivalent to finding maxima in the probability that two intensity observations share the same intensity source. When $\lambda_k=\lambda_l$, it can be said that $P(k,l,\lambda,Q)=P(k,l,\lambda_k,\lambda_l,Q)$. Moreover, since the logged probability $-\ln P$ is convex, maxima corresponding to $\hat{\lambda}$ exist.

At block 606, intensity observations k and l are observed to determine if they are equal. If so ("yes" path from block 606) then the maxima of P(k,k,λ,Q) is found using the formula:

$$\hat{\lambda} = (q_k \ldots (q_{k+1} - 1)) \frac{1}{q_{k+1} - q_k^{-1}} \quad \text{(block 608)}.$$

Alternately, if at block 606, intensity observations k and l are determined to be unequal ("no" path from block 606), then a dichotomic search over the first derivative of P is conducted to find $\hat{\lambda}$ corresponding to minima for the convex function −ln(P) (block 610). In one implementation, the dichotomic search over the first derivative of P is conducted using the following algorithm:

Algorithm for finding the optimal $\hat{\lambda}$

Inputs are $k$, $l$, $q_k$, $q_{k+1}$, $q_l$, $q_{l+1}$ and $n_{iter}$.

Set $\lambda_{min} = 0$ and $\lambda_{max}$ sufficiently big, and $n = 0$,

While $n < n_{iter}$ and $P' \neq 0$ do

Set $\lambda \leftarrow \frac{\lambda_{min} + \lambda_{max}}{2}$ and $n \leftarrow n + 1$.

Compute $P' = -\frac{\partial \ln(P(k, l, \lambda, Q))}{\partial \lambda}$

If $P' < 0$ set $\lambda_{min} \leftarrow \lambda$.

If $P' < 0$ set $\lambda_{max} \leftarrow \lambda$.

done

Set $\hat{\lambda} \leftarrow \lambda$.

Alternately, to find the optimal $\hat{\lambda}$, other descent methods such as gradient descent, Newton-Raphson, etc. can also be used.

The sign of P' can be determined (block 612) by computing the sign of:

$$\left( \frac{\lambda^{q_{k+1}-1}}{(q_{k+1}-1)!} - \frac{\lambda^{q_k-1}}{(q_k-1)!} \right) \sum_{i=q_l}^{q_{l+1}-1} \frac{\lambda^i}{i!} + \left( \frac{\lambda^{q_{l+1}-1}}{(q_{l+1}-1)!} - \frac{\lambda^{q_l-1}}{(q_l-1)!} \right) \sum_{i=q_k}^{q_{k+1}-1} \frac{\lambda^i}{i!} \quad (A)$$

Once the optimal $\hat{\lambda}$ is found in block 608, or in blocks 610-612, the optimal value for $\hat{\lambda}$ is then used by method 600 to determine the intensity similarity function by plugging the optimal $\hat{\lambda}$ into the following function (block 614):

$$d(k, l, Q) = \min_{\lambda} \{-\ln(P(k, l, \lambda, Q))\} \quad (14)$$

$$= -\ln P(k, l, \hat{\lambda}, Q)$$

$$= -\ln \left\{ e^{-2\hat{\lambda}} \left( \sum_{i=q_k}^{q_{k+1}-1} \frac{\hat{\lambda}^i}{i} \right) \left( \sum_{j=q_l}^{q_{l+1}-1} \frac{\hat{\lambda}^j}{j!} \right) \right\}$$

From the intensity similarity function, an intensity similarity measure can be calculated.

An Exemplary Operating Environment

Figure 7:
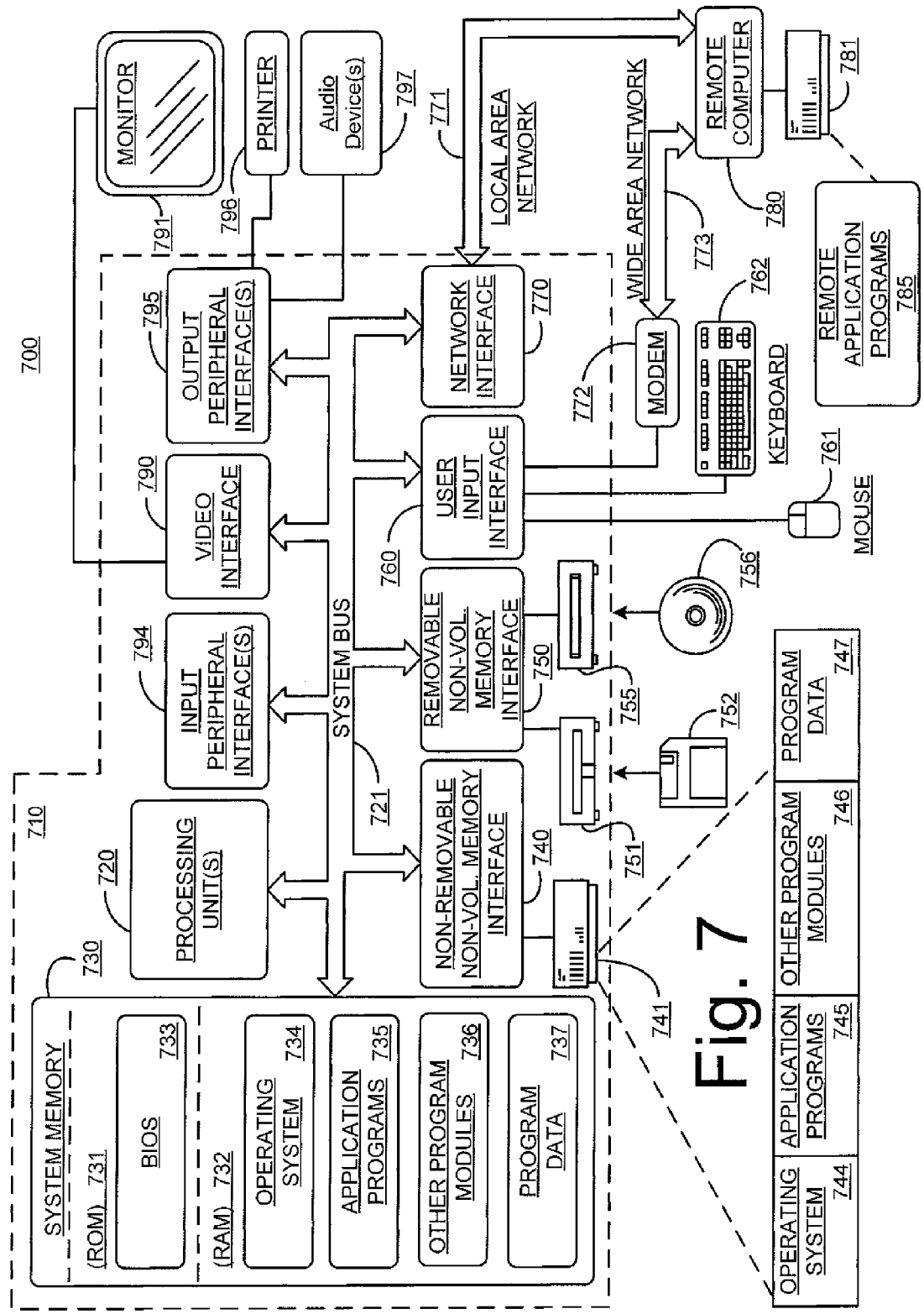
FIG. 7 illustrates an example of a suitable computing environment in which an intensity similarity function may be established based on Poisson-quantization noise.

FIG. 7 illustrates an example of a suitable computing environment in which a Poisson-quantization (PQ) noise model can be used to create an intensity similarity measure. Exemplary computing environment 700 is only one example of a suitable computing environment for the exemplary system of FIG. 1, exemplary computing device of FIG. 2, and exemplary operations of FIGS. 5-6, and is not intended to suggest any limitation as to the scope of use or functionality of systems and methods the described herein. Neither should computing environment 700 be interpreted as having any dependency or requirement relating to any one or combination of components illustrated in computing environment 700.

The methods and systems described herein are operational with numerous other general purpose or special purpose computing systems, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 7, an exemplary system for calculating an intensity similarity measure based on the PQ noise model includes a general purpose computing device in the form of a computer 710 implementing, for example, computing device 200 of FIG. 2. The following described aspects of computer 710 are exemplary implementations of computing device 200, computer 116, computers 122(1)-122(N) and camera 102. Components of computer 710 may include, but are not limited to, processing unit(s) 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 710 typically includes a variety of computer-readable media. Computer-readable media can be any available media that can be accessed by computer 710 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Application programs 735 includes, for example program modules of computing devices 102 or 104 of FIG. 1. Program data 737 includes, for example, program data of computing devices 102 or 104 of FIG. 1. Operating system 744, application programs 745, other program modules 746, and program data 747 are given different numbers here to illustrate that they are at least different copies.

A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus 721, but may be connected by other interface and bus structures, such as a parallel port, game port or a universal serial bus (USB).

A monitor 791 or other type of display device is also connected to the system bus 721 via an interface, such as a video interface 790. In addition to the monitor, computers may also include other peripheral output devices such as printer 796 and audio device(s) 797, which may be connected through an output peripheral interface 795.

The computer 710 operates in a networked environment using logical connections to one or more remote computers, such as a remote computer 780. In one implementation, remote computer 780 represents computing device 102 or networked computer 104 of FIG. 1. The remote computer 780 may be a personal computer, a server, a router, a network PC, a peer device or other common network node, and as a function of its particular implementation, may include many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example and not limitation, FIG. 7 illustrates remote application programs 785 as residing on memory device 781. The network connections shown are exemplary and other means of establishing a communications link between the computers may be used.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claimed invention.

The invention claimed is:

1. A computer-readable media having computer-program instructions executable by a processor for:
   receiving image information;
   generating a Poisson-quantization noise model from a Poisson noise model and a quantization noise model; and
   estimating Poisson-quantization noise in the image information using the Poisson-quantization noise model;
   wherein the Poisson noise model comprises:

$$p(k, \lambda, Q) = \sum_{i=q_k}^{q_{k+1}-1} \frac{\lambda^i}{i!} e^{-\lambda}$$

wherein k represents an intensity level, λ represents an intensity source, and Q represents quantization.

2. The computer-readable media as recited in claim 1, wherein receiving comprises receiving at least two frames of image information.

3. The computer-readable media as recited in claim 1, wherein generating comprises combining the Poisson noise model and the quantization noise model.

4. The computer-readable media as recited in claim 1, further comprising:
   determining an intensity similarity function using the Poisson-quantization noise model; and
   finding pixel correspondence using the intensity similarity function.

5. The computer-readable media as recited in claim 4, wherein the intensity similarity function comprises:

$$d(k, l, Q) = \min_\lambda\{-\ln(P(k, l, \lambda, Q))\}$$
$$= -\ln P(k, l, \hat{\lambda}, Q)$$
$$= -\ln\left\{e^{-2\hat{\lambda}}\left(\sum_{i=q_k}^{q_{k+1}-1}\frac{\hat{\lambda}^i}{i}\right)\left(\sum_{j=q_l}^{q_{l+1}-1}\frac{\hat{\lambda}^j}{j!}\right)\right\}.$$

wherein k and l represent two intensity observations, λ represents an intensity source, P represents a joint probability, $\hat{\lambda}$ represents an intensity source maximizing the joint probability P, and Q represents quantization.

6. The computer-readable media as recited in, wherein determining comprises finding a maximum joint probability that that two intensity observations k and l share the same intensity source.

7. The computer-readable media as recited in claim 6, wherein finding comprises performing a dichotomic search over the first derivative of the joint probability to find $\hat{\lambda}$ corresponding to minima for the convex function −ln(P).

8. The computer-readable media as recited in claim 6, wherein finding comprises one of performing a gradient descent, and performing a Newton-Raphson descent to find the optimal $\hat{\lambda}$.

9. A computer-readable media having computer-program instructions executable by a processor for:
   receiving two frames of image information;
   estimating quantization parameters for a Poisson-quantization noise model; and
   establishing an intensity similarity measure;
   wherein estimating, comprises fitting observed noise data to $$V(E, q, q_1) = \frac{E}{q} + \frac{q^2 + 12q_1 - 6q - 7}{12q^2}$$

wherein V represents a variance, E represents a mean, q represents the number of electrons necessary to raise an observed intensity one level, and $q_1$ represents the minimum number of electrons to produce an intensity level of 1.

10. The computer-readable media as recited in claim 9, wherein the Poisson quantization noise model comprises:

$$p(k, \lambda, Q) = \sum_{i=q_k}^{q_{k+1}-1}\frac{\lambda^i}{i!}e^{-\lambda}.$$

wherein k represents an intensity level, λ represents an intensity source, Q represents quantization, and $q_k$ represents the minimum number of electrons to produces an intensity level of k.

11. The computer-readable media as recited in claim 9, wherein the computer-program instructions further comprise instructions for finding pixel correspondence between the two frames based on the intensity similarity measure.

12. The computer-readable media as recited in claim 9, wherein establishing comprises calculating the intensity similarity measure:

$$d(k, l, Q) = \min_\lambda\{-\ln(P(k, l, \lambda, Q))\}$$
$$= -\ln P(k, l, \hat{\lambda}, Q)$$
$$= -\ln\left\{e^{-2\hat{\lambda}}\left(\sum_{i=q_k}^{q_{k+1}-1}\frac{\hat{\lambda}^i}{i}\right)\left(\sum_{j=q_l}^{q_{l+1}-1}\frac{\hat{\lambda}^j}{j!}\right)\right\}$$

wherein k and l represent two intensity observations, λ represents an intensity source, P represents a joint probability, $\hat{\lambda}$ represents an intensity source maximizing the joint probability P, Q represents quantization, and $q_k$ represents the minimum number of electrons to produce an intensity level of k.

13. A computing device comprising:
   a processor;
   a Poisson-quantization noise modeling module executable on the processor to estimate Poisson quantization noise; and
   an intensity similarity measure module executable on the processor to determine an intensity similarity function based on the estimated Poisson quantization noise;
   wherein the Poisson-quantization noise modeling module estimates Poisson quantization noise using a Poisson-quantization noise model comprising:

$$p(k, \lambda, Q) = \sum_{i=q_k}^{q_{k+1}-1}\frac{\lambda^i}{i!}e^{-\lambda}.$$

wherein k represents an intensity level, λ represents an intensity source, Q represents quantization, and $q_k$ represents the minimum number of electrons to produce an intensity level of k.

14. The computing device of claim 13, wherein the Poisson-quantization noise module estimates quantization parameters for two image frames.

15. The computing device of claim 13, wherein the intensity similarity function comprises:

$$d(k, l, Q) = \min_\lambda\{-\ln(P(k, l, \lambda, Q))\}$$
$$= -\ln P(k, l, \hat{\lambda}, Q)$$

-continued $$= -\ln\left\{e^{-2\hat{\lambda}}\left(\sum_{i=q_k}^{q_{k+1}-1}\frac{\hat{\lambda}^i}{i}\right)\left(\sum_{j=q_l}^{q_{l+1}-1}\frac{\hat{\lambda}^j}{j!}\right)\right\}$$

wherein k and l represent two intensity observations, $\lambda$ represents an intensity source, P represents a joint probability, $\hat{\lambda}$ represents an intensity source maximizing the joint probability P, Q represents quantization, and $q_k$ represents the minimum number of electrons to produce an intensity level of k.

16. The computing device of claim 13, wherein the computing device is used to improve images in one of night vision, medical imaging, underwater imaging, microscopic imaging and astronomical imaging.

17. The computing device of claim 13, further comprising:
a pixel correspondence module for finding pixel correspondence between image frames based on the intensity similarity function.

18. A computer-implemented method comprising:
receiving image information;
generating a Poisson-quantization noise model from a Poisson noise model and a quantization noise model; and
estimating Poisson-quantization noise in the image information using the Poisson-quantization noise model,
wherein generating comprises combining the Poisson noise model and the quantization noise model.

* * * * *